INVENTOR.
RONALD S. DODGSON
BY Wm. Walter Owen
ATTY.

April 15, 1958 R. S. DODGSON 2,831,066

TELEPHONE CALL INTERCEPTING SYSTEM

Filed July 12, 1956 4 Sheets-Sheet 2

INVENTOR.

RONALD S. DODGSON

BY Mc Watters Owen

ATTY.

April 15, 1958 R. S. DODGSON 2,831,066

TELEPHONE CALL INTERCEPTING SYSTEM

Filed July 12, 1956 4 Sheets-Sheet 3

INVENTOR.
RONALD S. DODGSON
BY [signature]
ATTY.

INVENTOR.
RONALD S. DODGSON
BY Wm. Walter Owen
ATTY.

United States Patent Office 2,831,066

Patented Apr. 15, 1958

2,831,066

TELEPHONE CALL INTERCEPTING SYSTEM

Ronald S. Dodgson, Chicago, Ill., assignor to General Telephone Laboratories, Incorporated, a corporation of Delaware Application July 12, 1956, Serial No. 597,435

6 Claims. (Cl. 179—27)

Figure 1:
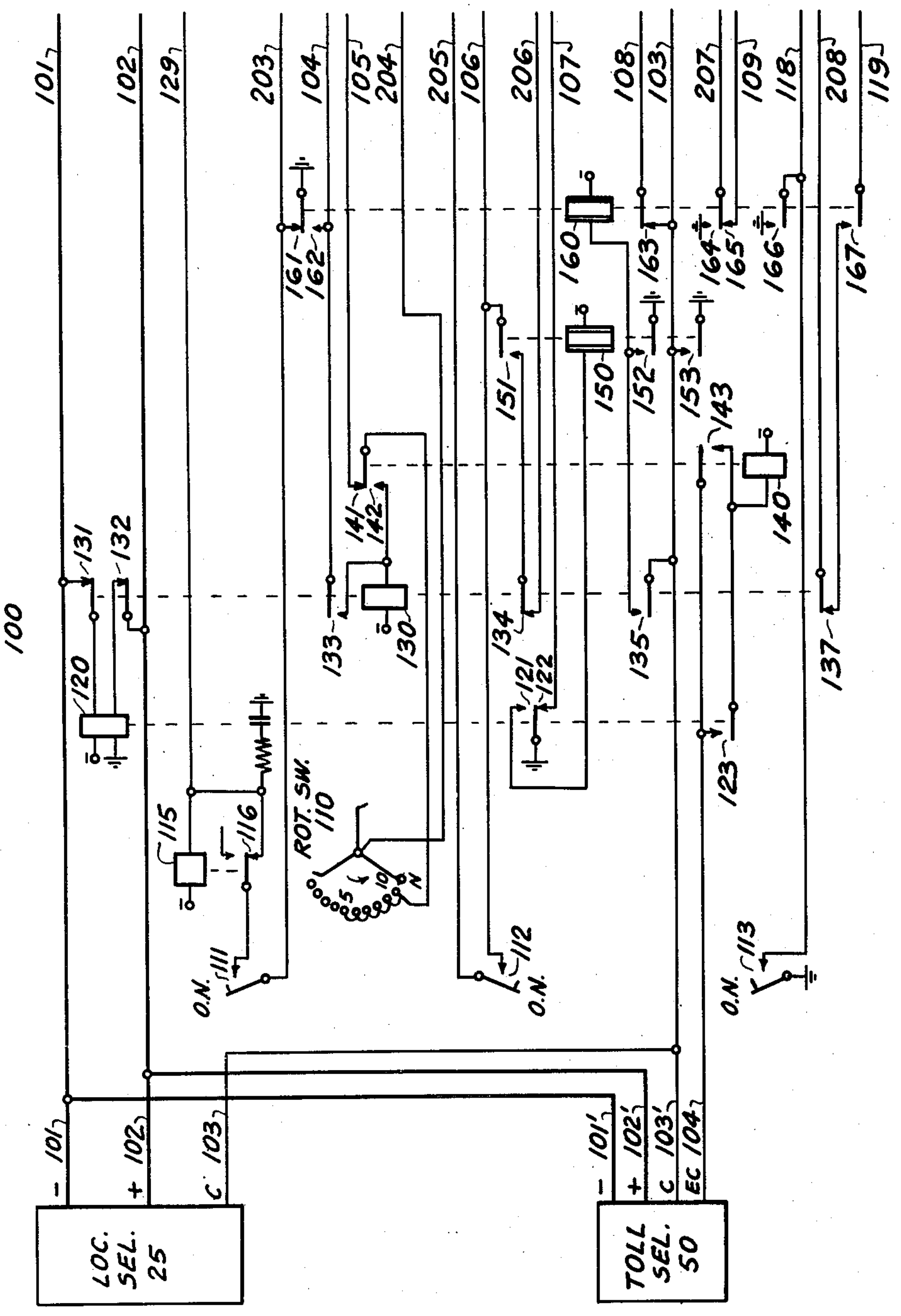

The present invention relates in general to telephone systems, and more particularly, to improvements in call intercepting apparatus to be used in automatic telephone exchanges, for intercepting calls to certain stations on the party lines of the system.

In telephone systems of the character indicated, when one or more of the subscriber stations on a party line have been taken out of service or disconnected from the line, it is desirable, on the calls made to such stations or to non-existing lines, that the calling party be advised in some manner that the called party cannot be reached, in order to reduced wasted calls and avoid tying up switching equipment needlessly.

Also, in telephone systems of the character indicated, when there exists no corresponding telephone line or succeeding switching equipment from certain levels of selectors, it is desirable, on dial calls made to such levels, that the call be diverted to an intercept circuit where succeeding digits dialled will be absorbed before switching through to intercept service outlets.

Various systems have been devised to accomplish this purpose by transferring the call to an operator, but most of these systems have limitations of various kinds, such as high cost, or the use of special ringing systems or switching equipment, or excessive absorbing equipment.

It is an object therefore of the present invention to provide an intercept circuit which absorbs extra digits before ringing to, and switching through to, service outlets by timing the inter-digital pause between dialled digits to determine when the last digit has been dialled.

Another object of the invention, is the provision of a common intercept circuit, and intercept trunk circuit for local or toll call answering by an operator.

A feature of the invention resides in the use of a single level rotary switch in said intercept circuit to delay ringing to the answering circuit by absorbing digits and timing the inter-digital pause between digits.

Other objects and features of the invention will be apparent from the specification and claims which follow, with due reference to the attached drawings comprising Figs. 1 to 4 which are also part of the specification.

Figure 2:
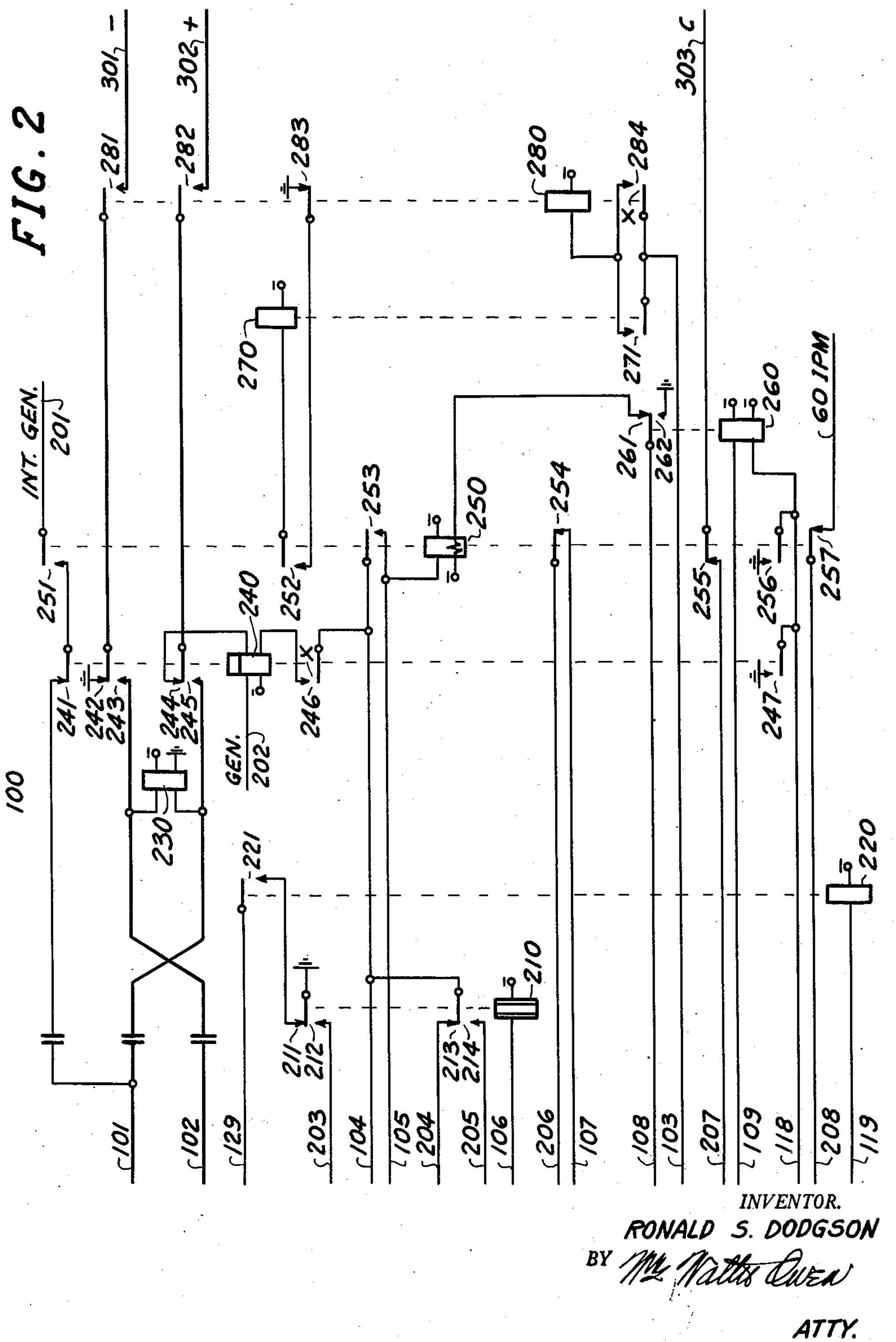

In the drawings:

Figs. 1 and 2, with Fig. 2 placed to the right of Fig. 1, show the intercept circuit.

Figure 3:
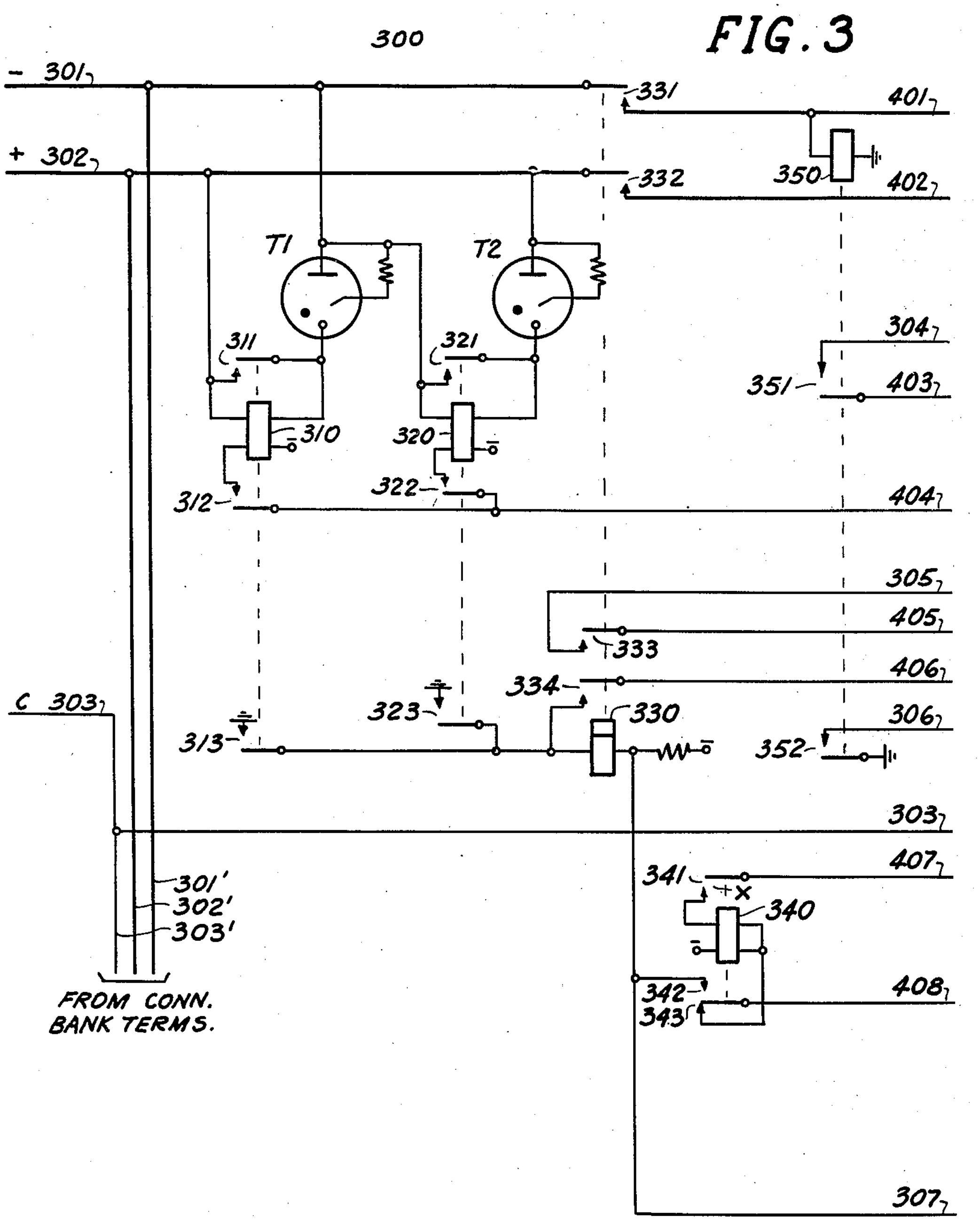
Figure 4:
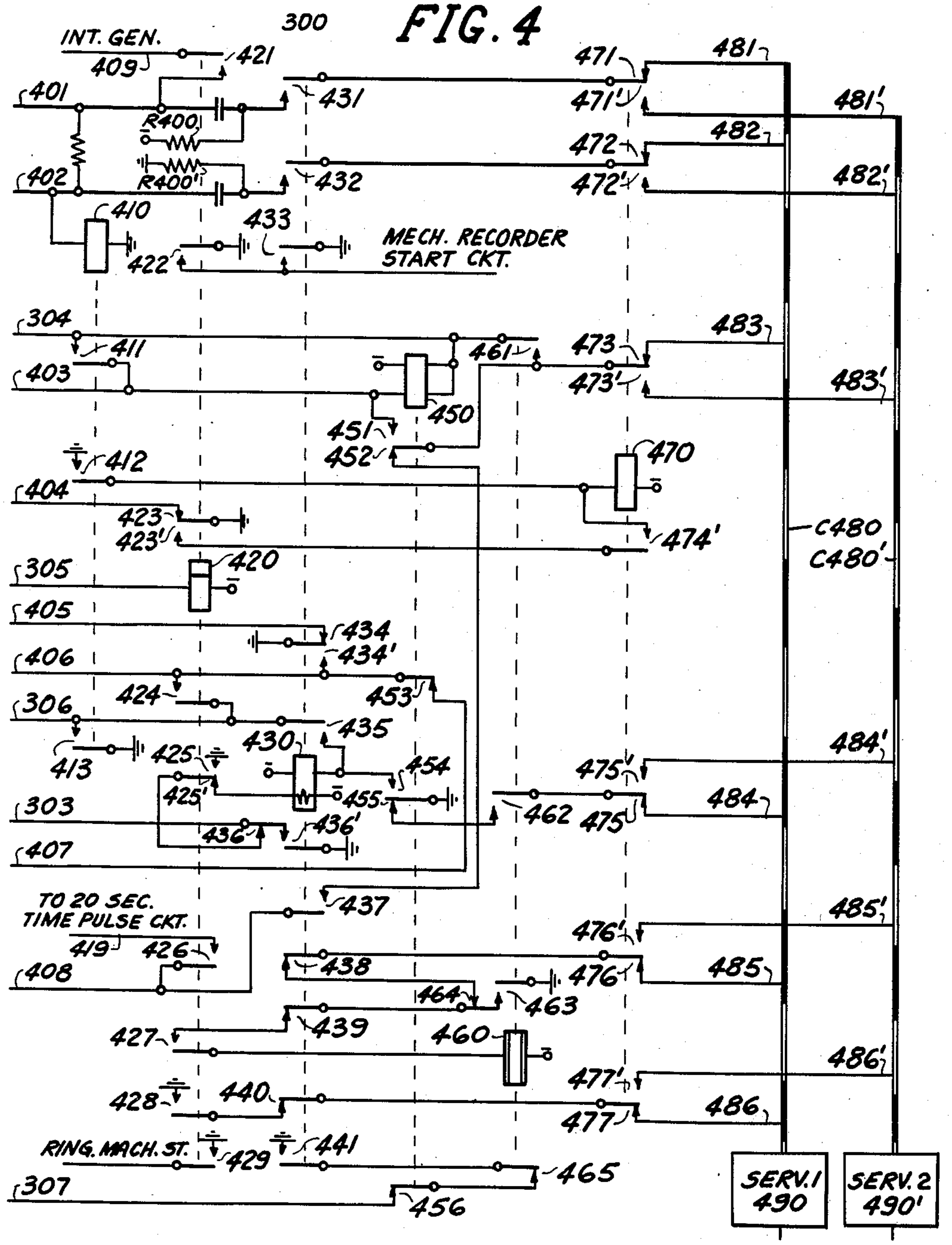

Figs. 3 and 4, with Fig. 4 placed to the right of Fig. 3, show the intercept trunk circuit and Service outlets.

Referring to the drawings, Fig. 1 shows a local selector 25 and a toll selector 50 both in block form and having common access to intercept circuit 100, via unused levels of these selectors. In most cases, a definite number of these intercept circuits would be provided, according to the average requirements of the system, with facilities for connection to the various unused selector levels as needed. It is to be understood that these selectors can be of any rank i. e., a first selector, second selector, etc.

It has been a common practice to connect unused levels of selectors directly to an intercept operators position prior to a calling party having dialled the entire intended series of digits. During such occurrences, the intercept operator upon answering may receive the clicking of the calling party's dial in her ear until the calling party completes his dialling, as he may be unaware that he dialled an incorrect or unused telephone directory number. To overcome such occurrences, the present invention provides a digit interval timer and absorber as part of the intercept circuit to absorb digits dialled within a predetermined time, and initiate ringing to an intercept trunk when the inter-digital pause between digits exceeds this predetermined time. Also, when the inter-digital pause exceeds this predetermined time, it is assumed that the last digit has been dialled, whereby, ring-back tone will be sent back to the calling party to notify him that his intended or non-intended call is ringing forward. If the time interval between digits exceeds the time allowance and ringing and ring-back tone are being sent, should the calling party ignore the ring-back tone and dial subsequent digits anyway, the circuit would be opened and the digits would have no effect on the operations already taking place.

The digit absorber and inter-digital pause timer in part consists of a single level, ten point rotary switch 110, including a normal position N. When the present intercept circuit is seized, a circuit is completed for pulsing the rotary switch at the rate of sixty interruptions per minute (one interruption per second), to step one of the wipers at the rate of one bank contact per second. The bank contacts 5–10 are multipled together and control the ringing and ring-back circuits. If the calling party fails to dial after five seconds, or the inter-digital pause between dialled digits exceeds five seconds, the wiper will be stepped to the fifth bank contact and ringing and ring-back tone will be initiated. However, if the calling party dials a subsequent digit before the wiper reaches the fifth bank contact (dialling within five seconds), a self-interrupter circuit is completed responsive to the receipt of digital impulses to rapidly step the wiper to its normal position N, where the self-interrupter circuit will be opened, and the wipers will again step at the rate of one bank contact per second. Thus, for each digit dialled within a five second interval, the digits will be absorbed and the ringing forward and the ring-back tone will be prevented until the last digit has been dialled, or the inter-digital pause between digits dialled exceeds five seconds.

Referring to Fig. 4, there is shown, Service 1 equipment 490 and Service 2 equipment 490', both in block form. For convenience in explaining the forthcoming specification, it will be assumed that Service 1 is an intercept operator's service desk, and Service 2 is a mechanical recorder. Also, shown in Figs. 3 and 4, there is an intercept trunk circuit 300 for controlling the extension of calls to either Service 1 or Service 2. It will be further assumed that calls terminating in this trunk circuit from selector levels and intercept circuits will be connected through to Service 1, and calls terminating in this trunk circuit from connector banks will be connected through to Service 2.

A detailed explanation will now follow:

*Local call intercept service seizure*

Assuming that on a local call, and the dialling of a certain number of digits by a subscriber, local selector 25 is seized in a well-known manner. It will be further assumed that the calling subscriber inadvertently dials a subsequent digit which is not accessible to succeeding switching equipment for completing the call, i. e., a connector having access to a plurality of party lines. Instead, the wipers of local selector 25 will be stepped to an unused level where the call is diverted to an intercept circuit, such as intercept circuit 100.

Intercept circuit 100 is normally marked idle to selector 25 from battery on the C conductor 103 and through relay 250 (Fig. 2); the circuit extending from battery, lower non-inductive winding of relay 250, contacts 261, conductor 108, contacts 163, C conductor 103, to ground at a test relay (not shown) in selector 25. When intercept circuit 100 is seized, a loop circuit is completed to operate relay 120; the circuit extending from battery, upper winding of relay 120, contacts 131, negative conductor 101, through the preceding loop circuit, positive conductor 102, contacts 132, lower winding of relay 120, to ground. The operation of relay 120, at contacts 121, closes an obvious circuit to operate relay 150; the closing of contacts 123 having no effect on this type of call. The operation of relay 150, at contacts 151, prepares a circuit to relay 210; at contacts 152, an obvious circuit is closed to operate relay 160; at contacts 153, ground is returned over C conductor 103 to hold the preceding equipment in a well-known manner, and a circuit is prepared to relay 280.

The operation of relay 160, at contacts 162, prepares holding circuits to relays 210 and 250, and grounds the wipers of rotary switch 110. At contacts 163, the circuit for seizing intercept circuit 100 is opened, however selector 25 is held by the ground mentioned on the C conductor 103. At contacts 164 a circuit is completed to seize intercept trunk circuit 300 (Figs. 2 and 3), providing trunk circuit 300 is found to be idle. Assuming trunk circuit 300 is found idle, battery will be found on the C conductor 303; the circuit extending from battery, lower non-inductive winding of relay 430 (Fig. 4), contacts 425', 436, C conductor 303, contacts 255, conductor 207, and contacts 164 to ground. At contacts 166, a circuit is closed to operate relay 260; the circuit extending from battery, lower winding of relay 260, conductor 118, and contacts 166 to ground. At contacts 167, a sixty interruption per minute generator ground is closed to intermittently operate relay 220; the circuit extending from battery, winding of relay 220, conductor 119, contacts 167, 137, conductor 208, contacts 257, to 60 I. P. M. ground. The operation of relay 260 at contacts 262, prepares a multiple ground circuit to the preceding equipment.

Relay 220 responds to the 60 I. P. M. ground to alternately operate and restore one time per second, whereby upon each operation, at contacts 221, a circuit is completed to energize motor magnet 115; the circuit extending from battery, winding of motor magnet 115, conductor 129, contacts 221, 211, to ground. The energization of motor magnet 115, opens its self-interrupter contacts 116, however having no effect at this time. At the end of the first pulse, relay 220 restores, opening contacts 221 to deenergize motor magnet 115, which will in turn, step one of the wipers of rotary switch 110 onto the first bank contact. For each operation of relay 220, and the restoration thereof, motor magnet 115 will step the wipers at the rate of one step per second. When the wipers of rotary switch 110 take the first step, the off-normal springs 111 close. The closing of On contacts 111, prepares a self-interrupter circuit to motor magnet 115; at On contacts 112, a holding circuit is prepared to relay 210; at On contacts 113, a multiple ground is closed to relay 260, to maintain it operated.

*Discontinued dialling (local)*

In the event that the calling subscriber fails to continue dialling for any reason, the rotary switch wipers will continue to step at the rate of one step per second. After a five second pause, one of the rotary switch wipers will reach the fifth bank contact, whereby, a circuit is completed to operate relay 250; the circuit extending from battery, upper winding of relay 250, conductor 105, contacts 141, the multiple bank contacts 10, 9, 8, 7, 6, 5 of rotary twitch 110, wiper, conductor 204, contacts 213, conductor 104, contacts 162, to ground.

*Continued dialling and digit absorbing (local)*

It would be more than likely, that after selector 25 has seized intercept circuit 100, that the calling subscriber would continue to dial since he might be unaware that he has dialled a wrong digit. All subsequent digits therefore, are to be absorbed, and the inter-digital pause between digits are to be timed to prevent ringing and extending the loop circuit to the intercept service equipment until a predetermined time has elapsed after the last digit dialled. In this event, if the subscriber dials a subsequent digit before one of the wipers of rotary switch 110 reaches the fifth bank contact (which requires five seconds), relay 120 will intermittently restore responsive to the receipt of a series of digital impulses.

Upon receipt of the first of a series of digital impulses, the restoration of relay 120, at contacts 121, opens the circuit to relay 150, however, relay 150 being slow-to-release, remains operated throughout the series of digital impulses. At contacts 122, a circuit is completed to operate relay 210; the circuit extending from battery, winding of relay 210, conductor 106, contacts 151, 134, conductor 206, contacts 254, conductor 107, contacts 122, to ground. The operation of relay 210 at contacts 211, opens the 60 I. P. M. circuit to motor magnet 115 controlled by relay 220, however, at contacts 212 a self-interrupter circuit is completed to motor magnet 115; the circuit extending from battery, winding of motor magnet 115, self-interrupter contacts 116, On contacts 111, conductor 203, contacts 212, to ground. At contacts 214, a holding circuit is closed to relay 210; the circuit extending from battery, winding of relay 210, conductor 106, On contacts 112, conductor 205, contacts 214, conductor 104, contacts 162, to ground. Every time motor magnet 115 operates (over the self-interrupter circuit), contacts 116 open the operating circuit to motor magnet 115 to thus restore it, which will in turn upon restoration, reclose contacts 116 to again energize motor magnet 115. Each time motor magnet 115 restores, one of the wipers of rotary switch 110 will step one succeeding bank contact. When relay 120 reoperates responsive to the interval between the series of digital impulses, at contacts 122, the circuit to relay 210 is opened, however, relay 210 remains operated over the holding circuit described. When one of the wipers reach the normal position N, which was rapidly reached by means of the self-interrupter circuit to motor magnet 115, the On contacts would again open. The opening of On contacts 111, opens the self-interrupter circuit to motor magnet 115, which prevents further operation of motor magnet 115 thereover. At On contacts 112, the holding circuit to relay 210 is opened. At On contacts 113, one of the multiple grounds to relay 260 is opened. As the relay 120 is now operated and contacts 122 open, the circuit to relay 210 is opened, restoring relay 210. The restoration of relay 210, at contacts 211, recloses the 60 I. P. M. circuit controlled at contacts 221 of relay 220 to motor magnet 115. Motor magnet 115 again steps the wipers of rotary switch 110 at the rate of one bank contact per second. Thus, the first digit has been absorbed.

It is to be understood that either the original operating circuit or the holding circuit to relay 210 is opened first, depending on the digit dialled. However, it is assumed that no matter what digit is dialled, the series of digital impulses will be terminated before one of the wipers of rotary switch 110 reaches the normal position N.

Should the calling subscriber dial any more digits before one of the wipers reaches the fifth bank contact, the same sequence of operations stated above would take place.

After the last digit has been dialled and absorbed, after a five second pause one of the wipers of rotary switch 110 will be stepped to the fifth bank contact to complete a circuit to relay 250, as described in "Discontinued dialling (local)."

*Ringing (local)*

When relay 250 operates after a five second dialling pause, ring back tone is sent back to the calling subscriber via contacts 251; the circuit extending from interrupter generator over conductor 201, contacts 251, 241, condenser, negative conductor 101, and back through the preceding equipment over the negative side of the line. At contacts 252, an obvious circuit is completed to operate relay 270. At contacts 253, a locking circuit is closed to relay 250; the circuit extending from battery, upper winding of relay 250, contacts 253, conductor 104, contacts 162, to ground. At contacts 254, the prepared circuit to relay 210 is opened. At contacts 255, ground is removed from C conductor 303. At contacts 256, a further multiple circuit is closed to relay 260, to maintain this relay operated. At contacts 257, the 60 I. P. M. circuit to relay 220 is opened, to completely restore relay 220. The complete restoration of relay 220, at contacts 221, opens the circuit to motor magnet 115, to cause complete deenergization of motor magnet 115. One of the wipers of rotary switch 110 now rests on possibly the fifth or sixth bank contact.

The operation of relay 270, at contacts 271, closes a circuit to operate relay 280; the circuit extending from battery, winding of relay 280, contacts 271, C conductor 103, contacts 153, to ground. The operation of relay 280, closes its "X" contacts 284 first, to lock relay 280 operated; the circuit extending from battery, winding of relay 280, "X" contacts 284, C conductor 103, contacts 153, to ground. Shortly thereafter, the remaining contacts of relay 280 operate whereby, at contacts 281 and 282 ringing current is sent to intercept trunk circuit 300 to operate tube T2 and relay 320 in series. At contacts 283, the circuit to relay 270 is opened, restoring relay 270. The restoration of relay 270, at contacts 271 opens the operating circuit to relay 280, however, relay 280 remains operated over its locking path. Tube T2 (Fig. 3) will receive ringing current over conductor 202, upper winding of relay 240, contacts 244, 282, positive conductor 302, and through the plate of tube T2. When tube T2 has stored up the ringing current, the tube T2 will fire, and complete the circuit through the upper winding of relay 320, negative conductor 301, contacts 281, 243, to ground. The operation of relay 320, at contacts 321 short circuits its upper winding to operate the ring-trip relay 240. At contacts 322, a locking circuit to relay 320 is closed through its lower winding; the circuit extending from battery, lower winding of relay 320, contacts 322, conductor 404, contacts 423, to ground. At contacts 323, an obvious circuit is completed to operate relay 330.

The operation of relay 240 closes its "X" contacts 246 first, to complete a locking circut for this relay; the circuit extending from battery, lower winding of relay 240, "X" contacts 246, conductor 104, contacts 162, to ground. Thereafter, the remaining contacts of relay 240 operate whereby, at contacts 241, ring back tone is disconnected from the calling subscriber's line. At contacts 243 and 245, the loop circuit is extended to the intercept trunk circuit 300. At contacts 242 and 244, the operating circuits to tube T2 and relays 240 and 320 are opened, however, relays 240 and 320 remain operated over their respective holding paths. At contacts 247, a further multiple circuit is closed to relay 260 to maintain it operated.

The operation of relay 330, at contacts 331 and 332 further extends the loop circuit into intercept trunk circuit 300, and completes a circuit to operate relays 350 (Fig. 3) and 230 (Fig. 2) in series; the last mentioned circuit extending from battery, upper winding of relay 230, contacts 243, 281, negative conductor 301, contacts 331, conductor 401, winding of relay 350, to ground. At contacts 333, a circuit is closed to operate relay 420; the circuit extending from battery, winding of relay 420, conductor 305, contacts 333, conductor 405, contacts 434, to ground. At contacts 334, a locking circuit to relay 330 is prepared. The operation of relay 350, at contacts 351, a holding circuit to relay 450 is prepared. At contacts 352, holding circuits to relays 330 and 430 are prepared.

The operation of relays 420, at contacts 422, a circuit is closed to the mechanical recorded start circuit, however, having no significance on this type of call. At contacts 423, the holding circuit to relay 320 is opened, restoring relay 320. At contacts 424, a holding circuit is completed to relay 330; the circuit extending from resistance battery, winding of relay 330, contacts 334, conductor 406, contacts 424, conductor 306, contacts 352, to ground. At contacts 425, ground is placed on C conductor 303 and 303', to mark intercept trunk circuit 300 busy to other switches attempting access hereto, such as connectors. At contacts 427, relay 460 is connected to grounded lead 485 to operate relay 460; the circuit extending from battery, winding of relay 460, contacts 427, 439, 464, 438, 476, conductor 485, cable C480, to ground at the Service 1 equipment 490. At contacts 428, ground is placed on conductor 486 to light a lamp at the operator's position in the Service 1 equipment. At contacts 429, ground is closed to start the ringing machine, and at contacts 421 ring back tone is sent back to the calling subscriber.

The operation of relay 460, at contacts 461, closes relay 450 to conductor 483 and the Service 1 equipment 490. At contacts 462, ground is closed to conductor 484, and to the automatic desk start group multiple in Service 1 equipment 490. At contacts 464 the circuit to relay 460 is opened, however, at contacts 463 which closes before contacts 464 breaks, closes a locking circuit to relay 460 over an obvious path. At contacts 465, a prepared short circuit to relay 330 is opened.

*Dialling after a five second pause (local)*

Assuming that five seconds have elapsed after selector 25 has seized intercept circuit 100, and that the calling subscriber decides to dial subsequent digits. Under this condition relay 250 would have operated as explained in "Discontinued dialling (local)." As soon as relay 250 operates, at its contacts 253, relay 250 would lock operated to ground at contacts 162, and at contacts 251, ring back tone would be sent to the calling subscriber. Thus, once relay 250 operates, the sequence of operations as described in "Ringing (local)," will take place.

If the calling subscriber fails to hear the ring back tone (the calling subscriber may not have the receiver to his ear), and dials anyway, relay 120 will intermittently restore responsive to a series of digital impulses. Upon restoration of relay 120, at contacts 121, the circuit to relay 150 is opened, but as previously explained, will remain operated throughout the series of digital impulses. At contacts 122, the circuit to relay 210 is no longer completed since relay 250 is operated, and opened contacts 254. Thus, any more digits dialled by the calling subscriber will only pulse relay 120, and be absorbed, without having any effect on the operations already taking place in intercept circuit 100.

*Service desk answers (local)*

When the operator at the service desk notices the lighted lamp indicating an awaiting call, the answering thereof, places ground on conductor 483 to operate relay 450; the circuit extending from battery, upper winding of relay 450, contacts 461, 473, conductor 483, cable C480, to ground at the Service 1 equipment 490. The operation of relay 450, at contacts 451, completes a locking circuit for relay 450; the circuit extending from battery, upper winding of relay 450, conductor 304, contacts 351, conductor 403, contacts 451, 473, conductor 483, to ground. At contacts 453, a prepared locking circuit to relay 340 is opened. At contacts 454, an obvious circuit is closed to operate relay 430. At contacts 455, ground is removed from conductor 475. At contacts 456, the prepared short circuit to relay 330 is further opened. The operation of relay 430, at contacts 431 and 432, extends the loop circuit to the operator at the operator's service desk at Service 1 equipment 490. At contacts 434, the circuit to relay 420 is opened, restoring relay 420. At contacts 434′, an obvious multiple circuit is provided to maintain relay 330 locked operated. At contacts 435, a locking circuit is closed to relay 430; the circuit extending from battery, upper winding of relay 430, contacts 435, conductor 306, contacts 352, to ground. At contacts 436, the ground on C conductor 303 is removed, however, at contacts 436′, the ground is replaced on C conductor 303. At contacts 437, a circuit is prepared to relay 340. At contacts 439, the locking circuit to relay 460 is opened, to restore relay 460. At contacts 440, the circuit to the operator's lamp is opened, extinguishing the lamp. At contacts 441, a short circuit to relay 330 is prepared.

The restoration of relay 420, at contacts 421, cuts off the ring back tone to the calling subscriber. At contacts 424, the original locking circuit to relay 330 is opened however, relay 330 remains locked operated over the multiple locking circuit mentioned. At contacts 429, the ringing machine start circuit is opened, to cut off the ringing. The restoration of relay 460, at contacts 461 opens the original operating circuit to relay 450, however, relay 450 remains operated over its holding path. At contacts 465, the short circuit to relay 330 is further prepared.

Conversation may now take place over the loop circuit. Transmission battery and ground are provided for the operator at resistors R400 and R400′ over an obvious path. The operator may then notify the calling subscriber that he has inadvertently dialled an incorrect number.

*Release*

On release, intercept trunk circuit 300 is under control of the service desk operator, and intercept circuit 100 is under the control of the calling subscriber.

When the operator releases, ground is removed from conductor 483, to thus restore relay 450. The restoration of relay 450, at contacts 451 opens the locking circuit to relay 450. At contacts 454, the operating circuit to relay 430 is opened, however, relay 430 remains operated over its holding path. At contacts 456, the short circuit to relay 330 is closed to cause relay 330 to restore; the short circuit extending from ground, contacts 441, 465, 456, conductor 307, to relay 330. The restoration of relay 330, at contacts 331 and 332 opens the loop circuit to the operator, and restores relays 230 and 350. At contacts 334, the locking circuit to relay 330 is opened. The restoration of relay 350, at contacts 352, opens the holding circuit to relay 430, to thus restore relay 430. The restoration of relay 430, at contacts 431 and 432, further opens the loop circuit to the operator. At contacts 436′, ground is removed from the C conductor 303 and at contacts 436 battery is placed on C conductor 303 to mark intercept trunk circuit 300 idle to accessing equipment. At contacts 441, the short circuit to relay 330 is opened, however, having no effect on relay 330, since relay 330 completely restored. Intercept trunk circuit 300 is now at normal.

When the calling subscriber restores his handset, the loop circuit is opened to restore relay 120. The restoration of relay 120, at contacts 121, opens the circuit to restore relay 150. The restoration of relay 150, at contacts 152, opens the circuit to restore relay 160. At contacts 153, ground is removed from C conductors 103 and 103′ to restore relay 280, however, the restoration of relay 160, at contacts 163, recloses ground to C conductors 103 and 103′ to maintain intercept circuit 100 busy until the intercept circuit completely releases. Nevertheless, relay 160 is slow to release and relay 280 would restore before relay 160 replaced ground on C conductor 103. At contacts 161, a self interrupter circuit is closed to motor magnet 115; the circuit extending from battery, winding of motor magnet 115, contacts 116, On contacts 111, conductor 203, contacts 161, to ground. At contacts 162, the holding circuits to relays 240 and 250 are opened, restoring these relays. At contacts 166, one of the multiple grounds to relay 260 is opened.

The restoration of relay 280, at contacts 281 and 182, opens the loop circuit to intercept trunk circuit 300. At "X" contacts 284 the holding circuit to relay 280 is further opened. The restoration of relay 250, at contacts 255, places battery on C conductor 303 from the upper winding of relay 260. At contacts 256, another multiple ground is removed from the circuits to relay 260. The restoration of relays 240, at contacts 243 and 245, further opens the loop circuit. At contacts 247, another multiple ground is removed from the circuit to relay 260, however, relay 260 remains operated from ground at On contacts 113.

Over the self-interrupter circuit mentioned, the wipers of rotary switch 115 are rapidly stepped over the bank contacts to the normal bank contact N, which will operate the On springs. The opening of On contacts 111, restores motor magnet 115. At On contacts 113, the circuit to relay 260 is opened, restoring relay 260. The restoration of relay 260, at contacts 262 removes ground from C conductor 103 and 103′, and at contacts 261 battery is placed on C conductors 103 and 103′ to mark intercept circuit 100 idle to selectors, such as local selector 25 and toll selector 50. Intercept circuit 100 is now at normal.

*Timed out release*

If the service desk operator fails to answer, ground pulses on lead 419 are closed to the lower winding of relay 340 every twenty seconds; the circuit extending from battery, lower winding of relay 340, contacts 343, conductor 408, contacts 426, to the ground pulse. On the first ground pulse, relay 340 operates its "X" contacts 341 only, and shorts its upper winding. When the ground pulse is removed, the short circuit is removed and the relay 340 operates completely; the circuit extending from battery, lower and upper winding of relay 340, "X" contacts 341, conductor 407, contacts 453, conductor 406, contacts 424, conductor 306, contacts 352, to ground. At contacts 342, the twenty second time pulse circuit is closed to relay 330.

The next ground pulse on lead 419 short circuits relay 330; the short extending from ground, conductor 419, contacts 426, conductor 408, contacts 342, and through the winding of relay 330. Relay 330 restores, whereby, at contacts 331 and 332 opens the loop circuit to restore relays 230 and 350; at contacts 333, the circuit to relay 420 is opened, restoring relay 420; at contacts 334, the holding circuit to relay 330 is opened, insuring the restoration of relay 330. The restoration of relay 420; at contacts 424, the circuit to relay 340 is opened, restoring relay 340; at contacts 425, ground is removed from C conductor 303, and at contacts 425 place battery on C conductor 303 to mark intercept trunk circuit 300 idle to accessing switches; at contacts 426, the twenty second time pulse circuit is opened to relay 330; at contacts 428, the circuit to the operator lamp is opened, extinguishing this lamp; at contacts 429, the ringing machine is cut-off.

Intercept trunk circuit 300 is now at normal.

*Toll call intercept service seizure*

Assuming that the toll selector 50 is seized during dialling of a toll call, a loop circuit is completed through preceding toll equipment (not shown) from the calling party in a manner well known in the art. Assuming that the next digit dialled into the toll selector 50, is a digit corresponding to an unused level. In other words, a level on the selector which is not connected to succeeding equipment because no corresponding telephone number would exist, i. e. no group of connectors having access to a plurality of telephone lines in this exchange. The wipers of the toll selector would instead, rotate over this level in search of an idle intercept circuit, such as 100 (Figs. 1 and 2). We will further assume that upon rotation of the wipers of toll selector 50, that intercept circuit 100 has been found idle.

Intercept circuit 100 is marked idle to the toll selector 50 by battery through the lower winding of relay 250 (Fig. 2) on the C lead 103; the circuit extending from battery, lower non-inductive winding of relay 250, contacts 261, conductor 108, contacts 163, C conductors 103, 103', to ground through a test relay at the toll selector 50. When seized, a loop circuit is closed over negative and positive conductors 101' and 102', respectively. Over this loop circuit, relay 120 operates; the circuit extending from battery, upper winding of relay 120, contacts 131, negative conductors 101, 101', through the loop, positive conductors 102', 102, contacts 132, lower winding of relay 120, to ground. The operation of relay 120, at contacts 121, completes an obvious circuit to operate relay 150. At contacts 123, ground on EC lead 104 is closed to relay 140, to operate relay 140. The operation of relay 150, at contacts 151, prepares a circuit to relay 210; at contacts 152, an obvious circuit is closed to operate relay 160; at contacts 153, ground is placed on C leads 103' and 103 to hold the preceding equipment in a well-known manner, and mark intercept circuit 100 busy to other selectors, such as local selector 25. The operation of relay 140, at contacts 142, closes relay 130 to the multipled bank contacts of rotary switch 110; at contacts 143, relay 140 locks operated to the grounded EC lead 104. The operation of relay 160, at contacts 162, holding circuits are prepared to relays 130, 210, and 240. At contacts 163, battery is removed from the C conductors 103 and 103'. At contacts 164, ground is placed on C lead 303 and a circuit is closed to seize intercept trunk circuit 300, providing intercept trunk circuit 300 is found idle. Assumming intercept trunk circuit 300 is found idle, the last mentioned circuit extends from battery, lower non-inductive winding of relay 430 (Fig. 4), contacts 425', 436, C conductor 303, contacts 255, conductor 207, contacts 164, to ground. At contacts 166, a circuit is completed to operate relay 260; the circuit extending from battery, lower winding of relay 260, conductor 118, contacts 166, to ground. At contacts 167, a sixty interruption per minute ground generator is closed to relay 220; the circuit extending from battery, winding of relay 220, conductor 119, contacts 167, 137 conductor 208, contacts 257, to 60 I. P. M. ground.

Relay 220, upon receipt of the 60 I. P. M. ground, will operate one time every second (sixty times per minute). Each time relay 220 operates, at contacts 221, a circuit is closed to energize motor magnet 115; the circuit extending from battery, winding of motor magnet 115, conductor 129, contacts 221, 211 to ground. Each time relay 220 restores, at contacts 221, the circuit to motor magnet 115 is opened, to deenergize motor magnet 115 and step one of the wipers of rotary switch 115, one step onto the bank contacts. Thus, motor magnet 115, under the control of relay 220 which operates once every second, will step the wipers of rotary switch 110 at the rate of one step per second.

Upon the wipers of rotary switch taking the first step, and one of the wipers reaching the first bank contact, the off-normal springs will restore. At On contacts 111, a self-interrupter circuit to motor magnet 115 is prepared. At On contacts 112, a holding circuit to relay 210 is prepared. At On contacts 113, a second ground is closed to relay 260, maintaining relay 260 operated.

*Discontinued dialling (toll)*

In the event that the toll operator ceases to dial any more digits after toll selector 50 seized intercept circuit 100, after a five second pause one of the wipers of rotary switch 110 will reach the fifth bank contact. When the wiper reaches the fifth bank contact, a circuit is closed to operate relay 130; the circuit extending from battery, winding of relay 130, contacts 142, multiple bank contacts 10, 9, 8, 7, 6, 5 and wiper of rotary switch 110, conductor 204, contacts 213, conductor 104, contacts 162, to ground. The operation of relay 130, at contacts 131 and 132 opens the circuit to restore relay 120; at contacts 133, an obvious holding circuit to relay 130 is closed from ground at contacts 162; at contacts 134, a prepared circuit to relay 210 is opened; at contacts 135, an obvious holding circuit is closed to maintain relay 160 operated, from the grounded C conductor 103'; at contacts 137, the 60 I. P. M. circuit to relay 220 is opened to prevent further pulsing of relay 220 at this time. The restoration of relay 120, at contacts 121 opens the circuit to restore relay 150; at contacts 123, the original operating circuit to relay 140 is opened, however, relay 140 remains operated over the holding path mentioned.

The restoration of relay 150, at contacts 151, further opens a prepared circuit to relay 210; at contacts 152, the original operating circuit to relay 160 is opened, however, relay 160 remains operated over the holding path mentioned; at contacts 153, ground is removed from C conductors 103 and 103', however, a change of polarity exists in toll selector 50, and ground is placed on C conductor 103' in a well-known manner.

*Continued dialling (toll)*

Assuming that after toll selector 50 seizes intercept circuit 100, the toll operator dials a subsequent digit before the wiper of rotary switch 110 reaches the fifth bank contact. Upon receipt of the series of digital impulses, relay 120 will intermittently restore. Upon the first intermittent restoration of relay 120, at contacts 121, the circuit to relay 150 is opened, however, relay 150 is slow-to-release and will remain operated throughout the series of digital impulses. At contacts 122, a circuit is closed to operate relay 210; the circuit extending from battery, winding of relay 210, conductor 106, contacts 151, 134, conductor 206, contacts 254, conductor 107, contacts 122, to ground. At contacts 123, the original operating circuit to relay 140 is opened, however, relay 140 remains operated over the holding path mentioned.

The operation of relay 210, at contacts 211, opens the 60 I. P. M. circuit to motor magnet 115, however, at contacts 212, a self-interrupter circuit is closed to motor magnet 110; the circuit extending from battery, winding of magnet 115, self-interrupter contacts 116, On contacts 111, conductor 203, contacts 212, to ground. At contacts 213, the prepared circuit to relay 130 is opened. At contacts 214, a holding circuit to relay 210 is closed; the circuit extending from battery, winding of relay 210, conductor 106, On contacts 112, conductor 205, contacts 214, conductor 104, contacts 162, to ground.

Over the self-interrupter circuit mentioned, each time motor magnet 115 energizes, contacts 116 open, to deenergize the motor magnet. Each time the motor magnet deenergizes, contacts 116 close, to again energize the motor magnet. For each deenergization of motor magnet 115, one of the wipers of rotary switch 110 steps one bank contact. When one of the wipers reaches the normal position N, the off-normal springs operate, whereby at On contacts 111, the self-interrupter circuit to motor magnet 115 is opened, to deenergize the motor magnet; at On contacts 112, the holding circuit to relay 210 is opened, and should the series of digital impulses be terminated, relay 210 would restore since contacts 122 would open under this condition; at On contacts 113, one of the multiple grounds to relay 260 is opened, however, relay 260 would remain operated from other multiple grounds mentioned. At the end of the series of digital impulses, relay 120 again completely operates. The restoration of relay 210, at contacts 211, again closes the 60 I. P. M. controlled relay 220 (contacts 221) to again intermittently energize the motor magnet 115 at the rate of one energization per second. Thus, one of the wipers of the rotary switch 110 will again step at the rate of one bank contact per second.

Should the toll operator continue to dial subsequent digits, and if each digit is dialled before one of the rotary switch wipers reaches the fifth bank contact, the same sequence of operations as described above will take place. Thus, for each digit dialled before one of the rotary switch wipers reaches the fifth bank contact, the digits will be absorbed, and ringing of the intercept trunk circuit 300 (to be described) will not take place until the inter-digital pause between any plurality of dialled digits exceeds five seconds.

*Ringing (toll)*

If the toll operator ceases to dial subsequent digits after selector 50 seizes intercept circuit 100, or the inter-digital pause between digits exceeds five seconds whereby the rotary switch wipers reach the fifth bank contacts, a circuit would be completed to operate relay 130 as described in "Discontinued dialling (toll)." The operation of relay 130 would restore relay 120, and the restoration of relay 120, would in turn, restore relay 150 as described in "Discontinued dialling (toll)."

The tool operator will now operate her ringing key (not shown) to initiate ringing. The operation of the ringing key will remove ground from the EC lead 104, to restore relay 140. The restoration of relay 140, at contacts 141, closes a circuit to operate relay 250; the circuit extending from the battery, upper winding of relay 250, conductor 105, contacts 141, multiple bank contacts 10, 9, 8, 7, 6, 5 and wiper of rotary switch 110, conductor 204, contacts 213, conductor 104, contacts 162, to ground. At contacts 142, the original operating circuit to relay 130 is opened, however, relay 130 remains operated over the mentioned holding circuit. At contact 143, the holding circuit to relay 140 is opened to insure restoration of relay 140.

The operation of relay 250, at contacts 251, closes a circuit to return ring-back tone to the calling party. At contacts 252, an obvious circuit is closed to operate relay 270. At contacts 253, a holding circuit to relay 250 is closed; the circuit extending from battery, upper winding of relay 250, contacts 253, conductor 104, contacts 162, to ground. At contacts 254, a prepared circuit to relay 210 is opened. At contacts 255, ground is removed from C conductor 303. At contacts 256, an obvious further multiple circuit is closed to relay 260. At contacts 257, the 60 I. P. M. circuit to relay 220 is further opened. The operation of relay 270, at contacts 271, closes a circuit to operate relay 280; the circuit extending from battery, winding of relay 280, contacts 271, C conductors 103, 103', to ground.

The operation of relay 280, will close its "X" contacts 284 first, to close an obvious holding circuit for the relay. Thereafter, at contacts 281 and 282, ringing current is sent to intercept trunk circuit 300 to operate the tube T2 and relay 320 in series. The last mentioned circuit extending from generator battery via conductor 202, upper winding of relay 240, contacts 244, 282, positive conductor 302, the plate of tube T2, and the operation of tube T2 and the firing through its cathode, upper winding of relay 320, negative conductor 301, contacts 281, 243, to ground. At contacts 283, the circuit to relay 270 is opened, restoring relay 270. The restoration of relay 270, at contacts 271, opens the original operating circuit to relay 280, however, relay 280 remains operated over the mentioned holding circuit.

The operation of relay 320, at contacts 321, short circuits its upper winding to operate the ring-trip relay 240. The operation of relay 240, closes its "X" contacts 246 to lock relay 240 operated; the circuit extending from battery, lower winding of relay 240, "X" contacts 246, conductor 246, conductor 104, contacts 162, to ground. Thereafter, at contacts 241, ring-back tone is opened to the calling party; at contacts 242 and 244 the original operating circuit to relay 240 is opened, however, relay 240 remains operated over the mentioned locking circuit; at contacts 243 and 245, the loop circuit is extended to intercept trunk circuit 300; at contacts 247, another multiple ground is provided to maintain relay 260 operated.

The remaining ringing operation of intercept trunk circuit 300 is identical with that described in "Ringing (local)."

*Dialling after a five second pause (toll)*

Assuming that five seconds have elapsed after toll selector 50 has seized intercept circuit 100, and that the toll operator decides to dial subsequent digits. Under this condition relay 130 would have operated, as explained in "Discontinued dialling (toll)." The operation of relay 130 would open contacts 131 and 132 to restore relay 120, and disconnect relay 120 from the preceding loop circuit. Thus, any subsequent digits dialled into intercept circuit 100 would have no effect on this circuit. However, when the toll operator has dialled all the intended digits, she would then operate her ringing key, and ringing would take place as described in "Ringing (toll)."

*Service desk answers (toll)*

When the Service 1 operator answers, the identical operations in intercept trunk circuit 300 will take place as described in "Service desk answers (local)." Thus, the Service 1 operator will notify the toll operator or/and the calling subscriber that a wrong number has inadvertently been dialled.

*Release (toll)*

The release of intercept trunk circuit 300 is identical to that described in "Release (local)."

When the toll operator disconnects, ground is removed from C lead 103' and EC lead 104, restoring relay 160. The restoration of relay 160, at contacts 161, closes a self-interrupter circuit to the motor magnet 115; the circuit extending from battery, winding of magnet 115, contacts 116, On contacts 111, conductor 203, contacts 161, to ground. At contacts 162, the holding circuits to relays 130, 240, and 250 are opened, restoring these respective relays. At contacts 163, ground is placed on the C conductors 103 and 103' from contacts 262, to mark intercept circuit 100 busy until this circuit completely releases. At contacts 164, ground is removed from C conductor 303. At contacts 166, one of the multiple grounds to relay 260 is opened. At contacts 167, the 60 I. P. M. source to relay 220 is further opened.

Over the circuit to motor magnet 115, by means of its self-interrupter contacts 116, one of the rotary switch wipers is rapidly stepped to the normal position N, to thereby operate the off-normal springs. At On contacts 111, the self-interrupter circuit to motor magnet 115 is opened to completely deenergize the motor magnet. At On contacts 113, one of the multiple circuits to relay 260 is opened.

The restoration of relay 130, at contacts 131 and 132, prepares a future circuit to relay 120. The restoration of relay 240, at contacts 242 and 244, opens the loop circuit to intercept trunk circuit 300. At contacts 247 and the restoration of relay 250 at contacts 256, opens the remaining multiple circuits to relay 260, to thus restore relay 260. The restoration of relay 260, at contacts 262, removes ground from the C conductors 103 and 103', and at contacts 261 battery is placed on C conductors 103 and 103' to mark intercept circuit 100 idle to selectors attempting access hereto.

Intercept circuit 100 is now at normal.

*Connector to intercept trunk circuit*

In the event that a call diverted to intercept trunk circuit 300 from a connector (not shown), ringing would be transmitted over the negative conductors 301', 301 to operate tube T1 and relay 310. In this case, after the ring-trip relay in the connector operates, battery would be sent over conductor 302', to operate relay 410. The operation of relay 410, at contacts 412, would complete a circuit to operate relay 470. The operation of relay 470, at contacts 471', 472', 473', 475', 476', 477, would transfer the call to the Service 2 equipment 490'. At contacts 474', relay 470 would lock operated to ground at contacts 423'.

After the switching through to the intercept trunk circuit 300 from the connector, ground is placed on C conductors 303' and 303 to busy intercept trunk circuit 300, and operate relay 260 of intercept circuit 100; the circuit extending from battery, upper winding of relay 260, conductor 109, contacts 165, conductor 207, contacts 255, C conductors 303, 303' to ground. The operation of relay 260, at contacts 262, places a ground on C conductors 103 and 103', to mark intercept circuit 100 busy to selectors attempting access hereto, such as local selector 25 and toll selector 50.

Service 2 equipment 490' would preferably be mechanically recorded as previously mentioned, whereby recorded information would be transmitted over the loop circuit to the calling party notifying him of an inadvertently dialled wrong number.

Thus, Service 1 equipment 490 handles calls accessed from a selector and intercept circuit, and Service 2 equipment 490' would handle calls accessed from connectors. However, it is to be understood that the Service 1 and Service 2 equipment need not be restricted to the combinations used for example explanations, but various combinations could be used between an operator's desk position and a mechanical recorder.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, an intercept circuit, an intercept trunk circuit, a plurality of numerical switches, an intercept operator's answering position, a ringing source in said intercept circuit, means for extending connections between one of said numerical switches and said intercept circuit including a pair of conductors forming a loop circuit over which a plurality of series of digital impulses are received, a rotary switch in said intercept circuit including wipers and a plurality of wiper positions, circuit means controlled in a certain position of said rotary switch wipers for extending said ringing source to said intercept trunk circuit, a certain number of said wiper positions on said rotary switch for timing the inter-digital pause between each of said series of digital impulses to control the ringing source to said intercept trunk circuit, means for automatically stepping said rotary switch wipers responsive to seizure of said intercept circuit, means for stopping the automatic stepping of said rotary switch wipers responsive to the receipt of each series of digital impulses over said loop circuit and for again causing automatic stepping of said rotary switch wipers responsive to the termination of each series of digital impulses, a self-interrupter circuit completed to said rotary switch to step said wipers to a normal position responsive to the receipt of each of said series of digital impulses, for permitting said automatic stepping of said wipers over said certain number of said wiper positions and to said certain position of said rotary switch only after the interdigital pause between any series of digital impulses exceeds a predetermined time interval, means responsive to ringing said intercept trunk circuit for automatically extending said loop circuit to said intercept trunk circuit, means responsive to extending said loop circuit to said intercept trunk circuit for signalling an operator at said operator's position, and means responsive to the answering by said operator for further extending said loop circuit to said operators position.

2. In a telephone system, an intercept circuit, a plurality of local and toll type numerical switches, a rotary switch in said intercept circuit including wipers and a plurality of wiper positions, a ringing source in said intercept circuit, means for extending connections between said local or said toll type numerical switches and said intercept circuit including a pair of conductors forming a loop circuit over which a plurality of digital impulses are received, an operator's answering position, circuit means controlled in a certain position of said rotary switch for extending said ringing source to said intercept trunk circuit on local or toll type numerical switches accessing said intercept circuit, a certain number of said wiper positions on said rotary switch causing a timing of the inter-digital pause between each series of digital impulses to thereby prevent extending said ringing source to said intercept trunk circuit before said certain positions have been passed over, means for permitting stepping of said wipers to said certain position of said rotary switch only a predetermined time after a series of digital impulses, means responsive to ringing said intercept trunk circuit for automatically extending said loop circuit hereto, means responsive to extending said loop circuit to said intercept trunk circuit for cutting off said ringing and automatically signalling said operator at said operator's position, and means responsive to said operator answering said signal for further extending said loop circuit to said operators position.

3. In a telephone system, an intercept circuit, an intercept trunk circuit, a plurality of numerical switches, an intercept operator's answering position, means for extending connections between one of said numerical switches and said intercept circuit including a pair of conductors forming a loop circuit over which a plurality of series of digital impulses are received, a rotary switch in said intercept circuit including wipers and a plurailty of wiper positions, a ringing source in said intercept circuit, circuit means controlled in a certain position of said rotary switch wipers for extending said ringing source to said intercept trunk circuit, means for automatically stepping said rotary switch wipers responsive to seizure of said intercept circuit, means for stopping the automatic stepping of said rotary switch wipers responsive to the immediate receipt of each series of digital impulses over said loop circuit before said wipers were automatically stepped to said certain position and said automatic stepping means again stepping said wipers of said rotary switch responsive to the termination of each series of digital impulses, a self-interrupter circuit completed to said rotary switch to step said wipers to a normal position responsive to each immediate series of digital impulses to absorb said digital impulses, said automatic stepping means operating said rotary switch wipers to said certain position only responsive to an exceeded predetermined time delay between series of digital impulses to extend said ringing source to said intercept trunk circuit, means responsive to ringing said intercept trunk circuit for extending said loop circuit to said intercept trunk circuit, means responsive to extending said loop circuit to said intercept trunk circuit for cutting off said ringing and to signal said intercept operator at said intercept operator's position, and means responsive to said operator answering said signal for further extending said loop circuit to said operator's answering position.

4. In a telephone system, an intercept circuit, an intercept trunk circuit, a plurality of local type and toll type numerical switches, an intercept operator's answering position, means for extending connections between either type of numerical switch and said intercept circuit including a pair of conductors forming a loop circuit over which a plurality of series of digital impulses are received, a rotary switch in said intercept circuit including wipers and a plurality of wiper positions, a ringing source associated with said intercept circuit, circuit means controlled in a certain position of said rotary switch wipers for extending said ringing source to said intercept trunk circuit regardless of the type of numerical switch accessing said intercept circuit, means for automatically stepping said rotary switch wipers responsive to seizure of said intercept circuit by either of said type of numerical switch, means for stopping the automatic stepping of said rotary switch wipers responsive to the immediate receipt of each series of digital impulses over said loop circuit before said wipers were automatically stepped to said certain position, said automatic stepping means being again rendered effective responsive to the termination of each series of digital impulses, a self-interrupter circuit completed to said rotary switch to step said wipers to a normal position responsive to the receipt of each immediate series of digital impulses to absorb said digital impulses, said automatic means operating said wipers to said certain position responsive only to an exceeded predetermnied time delay between any series of digital impulses to extend said ringing source to said intercept trunk circuit, means responsive to ringing said intercept trunk circuit for extending said loop circuit to said intercept trunk circuit, means responsive to extending said loop to said intercept trunk circuit for cutting off said ringing and to signal said intercept operator at said operator's answering position, and means responsive to said operator answering said signal for further extending said loop circuit to said operator's answering position.

5. In a telephone system, an intercept circuit, an intercept trunk circuit, a plurality of numerical switches, means for extending connections between one of said numerical switches and said intercept circuit including a pair of conductors forming a loop circuit over which a plurality of series of digital impulses are received, a rotary switch in said intercept circuit including wipers and a plurality of wiper positions, a ringing source and ring-back source in said intercept circuit, a certain number of said wiper positions on said rotary switch for timing the inter-digital pause between each of said series of digital impulses to control the ringing source and said ring-back source, means for automatically stepping said rotary switch wipers responsive to seizure of said intercept circuit, means for stopping the automatic stepping of said rotary switch wipers responsive to the immediate receipt of each series of digital impulses over said loop circuit before said wipers were automatically stepped to said certain position, said automatic stepping means being again rendered effective responsive to the termination of each series of digital impulses, a self-interrupter circuit completed to said rotary switch to step said wipers to a normal position responsive to the receipt of each immediate series of digital impulses to absorb said digital impulses, said wipers being automatically stepped to said certain position responsive only to an exceeded predetermined time delay between any series of digital impulses to extend said ringing source to said intercept trunk circuit, and send ring-back tone to the calling party to notify said party that subsequent digits need not be further dialled, means responsive to ringing said intercept trunk circuit for extending said loop circuit to said intercept trunk circuit, means responsive to extending said loop circuit to said intercept trunk circuit for cutting off said ringing and ring-back source, means thereafter operated for signalling an operator at said operator's position, and means responsive to said operator answering said signal for further extending said loop circuit to said operator's answering position.

6. In a telephone system, an intercept circuit, an intercept trunk circuit, a plurality of numerical switches, means for extending conections between one of said numerical switches and said intercept circuit including a pair of conductors forming a loop circuit over which a plurality of series of digital impulses, are received, a rotary switch in said intercept circuit including wipers and a plurality of wiper positions, a ringing source and a ring-back source in said intercept circuit, a ring-back source in said intercept trunk circuit, a certain number of said wiper positions on said rotary switch for timing the inter-digital pause between each of said series of digital impulses to control the ringing source and ring-back source in said intercept circuit, means for automatically stepping said rotary switch wipers responsive to seizure of said intercept circuit, means for stopping the automatic stepping of said rotary switch wipers responsive to the immediate receipt of each series of digital impulses over said loop circuit before said wipers were automatically stepped to said certain position, said automatic stepping means being again rendered effective responsive to the termination of each series of digital impulses, a self-interrupter circuit completed to said rotary switch to step said wipers to a normal position responsive to the receipt of each immediate series of digital impulses to absorb said digital impulses, said wipers being automatically stepped over said certain number of said wiper positions and to said certain position responsive only to an exceeded predetermined time delay between any series of digital impulses to extend said ringing to said intercept trunk circuit, and send ring-back tone from said intercept circuit to the calling party, means responsive to ringing said intercept trunk circuit for extending said loop circuit to said intercept trunk circuit, means responsive to extending said loop circuit to said intercept trunk circuit for cutting off said ringing and said ring-back tone from said intercept circuit, means thereafter operated for signalling an operator at said operator's position and send ring-back tone to the calling party from the intercept trunk circuit, and means responsive to said operator answering said signal for further extending said loop circuit to said operator's answering position and cutting off said ring-back tone from said intercept trunk circuit.

References Cited in the file of this patent

UNITED STATES PATENTS

| | | |
|---|---|---|
| 1,558,872 | Helwig | Oct. 27, 1925 |
| 2,710,311 | Kessler | June 7, 1955 |
| 2,715,160 | Pharis | Aug. 9, 1955 |